United States Patent [19]
Spencer

[11] Patent Number: 5,915,249
[45] Date of Patent: Jun. 22, 1999

[54] SYSTEM AND METHOD FOR ACCELERATED QUERY EVALUATION OF VERY LARGE FULL-TEXT DATABASES

[75] Inventor: Graham Spencer, Cupertino, Calif.

[73] Assignee: Excite, Inc., Redwood City, Calif.

[21] Appl. No.: 08/661,335

[22] Filed: Jun. 14, 1996

[51] Int. Cl.[6] ............................................. G06F 17/30
[52] U.S. Cl. ................................... 707/5; 707/9; 707/10
[58] Field of Search ............................. 707/5, 9, 10

[56] References Cited

PUBLICATIONS

All I want for the holidays is –a little lexical help from my friends, (lexical analysis for information retrieval), Searcher, v1, n6, p16(1), Nov.–Dec. 1993.

*Primary Examiner*—Paul R. Lintz
*Assistant Examiner*—Shahid Alam
*Attorney, Agent, or Firm*—Fenwick & West LLP

[57] ABSTRACT

A system, method, and various software products provide for improved information retrieval in very large document databases through the use of a predetermined static cache. The static cache includes for terms that appear in a large number of documents, a plurality of documents ordered by a contribution that the term makes to the document score of the document. The contribution is a scalar measure of the influence of the term in the computed document score. The contribution reflects both the within document frequency and the between document frequency of the term. In addition, the static cache includes for each term a lookup table that references selected entries for the term in an inverted index. Queries to the database are then processed by first traversing the static cache and obtaining the contribution information thereform and computing the document score from this information. Additional term frequency information for other terms in the query is obtained by looking up the document in the lookup tables of the other query terms, and obtaining the term frequency information for such terms from the inverted index, or by searching the contribution caches of the query terms.

31 Claims, 9 Drawing Sheets

CONTRIBUTION CACHES 209

| | | 305 | |
|---|---|---|---|
| apple | (63,.98) | (3,.78) | (88,.45) |
| banana | (25,.75) | (12,.60) | (83,.32) |
| orange | (61,.69) | (77,.55) | (45,.21) |

Σ

LOOKUP TABLES 214

| (0,P) | (50,P) | (100,P) |
|---|---|---|
| (0,P) | (50,P) | (100,P) |
| (0,P) | (50,P) | (100,P) |

CONTRIBUTION CACHES 209

| | | 305 | |
|---|---|---|---|
| apple | (63,.98) | (3,.78) | (88,.45) |
| banana | (25,.75) | (12,.60) | (83,.32) |
| orange | (61,.69) | (77,.55) | (45,.21) |

LOOKUP TABLES 214

| (0,P) | (50,P) | (100,P) |
|---|---|---|
| (0,P) | (50,P) | (100,P) |
| (0,P) | (50,P) | (100,P) |

CONTRIBUTION CACHES 209

| | | | 305 | | | | |
|---|---|---|---|---|---|---|---|
| apple | (63,.98) | (3,.78) | (88,.45) | (2,C) | (55,C) | (142,C) | (25,C) |
| banana | (25,.75) | (12,.60) | (83,.32) | (55,C) | (3,C) | (31,C) | (53,C) |
| orange | (61,.69) | (77,.55) | (45,.21) | (4,C) | (12,C) | (10,C) | (63,C) |

$\Sigma$ 301
(3, 3.36)
(77, 2.68)
(61, 2.12)
(25, 2.05)
(12, 1.65)

SYSTEM AND METHOD FOR ACCELERATED QUERY EVALUATION OF VERY LARGE FULL-TEXT DATABASES

BACKGROUND

1. Field of Invention

The present invention relates to systems and methods for computer based text retrieval, and more particularly, to systems and method for text or information retrieval from very large text databases.

2. Background of Invention

An ever increasing amount of information is becoming available electronically, particularly through wide-area networks such as the Internet. The Internet and its various document collections as found in USENET, the World Wide Web, and various FTP and similar sites, is perhaps the largest collection of full-text information available. Already, tens of millions of documents are available in various document databases on the Internet. Performing rapid searches for information on the Internet already requires expensive, high performance computers with vast quantities of RAM and fast disk drives. Even worse, the Internet is rapidly growing. Some estimates claim that the amount of information available on the Internet doubles every four months. Effective computer performance doubles only every 18 to 24 months, and the cost per megabyte of storage improves even more slowly. To continue to scale with the growth of the Internet then, dramatic improvements in full-text retrieval methods are necessary in order to provide search results of relevant documents in an efficient and timely manner.

Typical information retrieval systems use an "inverted index" database format. For each unique term in the document database, the inverted index stores or identifies the documents which contain the term and a measure of the frequency of the term within each document. Term frequency may be measured in various manners, such as raw term counts, and various logarithmic functions thereof. Each document in the database has a unique document number, and the terms in the inverted index are typically sorted by document number so that multiple rows (terms) can be efficiently compared by iterating over the rows in parallel.

Conventional search systems process a query by scoring documents in the database according to term frequency information contained in the inverted index. The terms in the query are used to identify the relevant rows in the inverted index. These rows are then traversed, and document scores computed for each of the listed documents. Most such scoring functions are based on a between-document term frequency known called the inverse document frequency (IDF) of each term that reflects the frequency of occurrence of the term within a document database, a within-document term frequency that reflects the frequency of a term in each document, and a normalization factor k, typically the length of the document vector. Such a scoring function may be:

$$S_D = \sum_q W_q * \frac{f_{D,q} IDF_q}{l_D} \quad (1)$$

where $S_D$ is the document score for document D, q iterates over each term of the query, $W_q$ is a weight for term q, $IDF_q$ is the IDF of term q in a given document database, $f_{D,q}$ is the within-document frequency of term q in document D, and $l_D$ is the normalization factor for document D, typically the length of the vector represented by the document.

One problem with this database design and query processing technique is that it does not take into account the relative significance of terms in database structure itself. Experience with large text databases has shown that terms that most often appear in queries are typically the same terms that occur most frequently in the document collection itself. Therefore, these terms typically have a large number of document/frequency tuples in the inverted index. Reading and processing all these tuples in order to compute document scores is computationally expensive and time consuming.

Some conventional information retrieval systems use a different sort order in the inverted index to arrange the documents corresponding to each term. However, this means that the documents cannot be efficiently stored using a differential compression technique, which is one known method for decreasing the size of the inverted index. Differential compression techniques are typically quite efficient on dense rows when those rows are sorted by increasing document number; using a different sort order eliminates this benefit. Therefore the total bytes required to store the document/frequency tuples for the given term increases dramatically. The increased size of the inverted index in turn has a significant impact on the resources required to store and manage the database.

Other conventional information retrieval systems cache the results of frequent queries so that the database and inverted index do not need to be processed and scored when the query is already contained in the cache. However, queries performed on a general purpose retrieval system with a very diverse document collection, as is typical on the Internet, tend to exhibit little repetition. For example, on some existing Internet search systems, only 30% of the queries occur more than ten times per day, and only 50% occur more than once, out of thousands of queries. Caching even the 30% of queries that repeat would only marginally improve performance, and require substantial memory resources.

Accordingly, it is desirable to provide a database structure and query processing technique that efficiently handles queries in very large text databases, and accounts for the significance and repetitiveness of certain terms in the queries, while still providing scalablity as the document collection grows.

SUMMARY OF THE INVENTION

The present invention overcomes the limitations of conventional information retrieval systems through the use of an improved database organization and query execution process. Generally, a database in accordance with the invention includes in addition to the inverted index, a small persistent data structure that stores a static cache of "important" documents for some (or all) of the terms in the inverted index. The static cache stores sufficient information about each document to enable the retrieval system to quickly calculate a document score for the important documents without having to traverse the inverted index in a conventional manner. This cache is consulted for each term in a query, and if possible the query is completed and documents scored from the cache using the information contained therein. A significant feature provided by the system is the ability to prune the search so that only a relatively few documents must be scored in order to obtain bounds on the scores of all the other documents in the collection. As a result, a relatively small number of documents are scored and returned, while still guaranteeing that no unscored document is more relevant to the query than those that were scored.

In one embodiment, the present invention comprises a contribution cache and an efficient mechanism for accessing arbitrary documents in inverted index. In one implementation discussed here, the latter mechanism is fulfilled by the lookup-table, but other methods could be used as well.

In an information retrieval system in accordance with the present invention, there is provided a database of documents stored persistently in one or more computer readable memories, such as hard disk, optical disk, or the like. A typical database used with the invention may have 500,000 or more documents, and may be distributed across various computer systems. Each document is associated with a unique document identifier. During query processing of a query containing a number of terms t, documents are scored by the system according to the following formula:

$$S_D = \sum_{i=1}^{t} W_t c_t \quad (2)$$

where $S_D$ is the score of document D, $W_t$ is the (normalized) weight of term t in the query and $c_t$ is the contribution from term t to the overall score for the document D. Equation (2) is a re-expression of (1) above, where $c_t$ is:

$$c_t = \frac{f_{D,t} IDF_t}{l_D} \quad (3)$$

where $f_t$ is a frequency of the term t in document D, and $IDF_t$ is an inverse document frequency of the term t in the database.

In accordance with the present invention, the database is structured to include an inverted index, which may be conventional. In addition to (or incorporated directly in) the inverted index, there is provided the static cache. The static cache contains an entry for each term of the inverted index that has more than k (document, term frequency) tuples. K may be set at any useful value, depending on the total number of documents in the database, and the distribution of documents across terms. In most preferred embodiments, k is typically between 500 and 2000. In general, these are the terms for which a query would typically require very extensive and time consuming processing in a conventional system due to the number of documents that contain the term in the inverted index, which for common terms, may be in the tens of thousands, or more. This is because, as noted above, the documents in the inverted index are typically ordered by some document identifier, and not by any measure of the significance of the term to the document or the database as a whole. The present invention eliminates this defect with the static cache.

In one embodiment, each entry in the static cache includes a contribution cache and a lookup table. The contribution cache contains a list of (document, contribution) tuples where "contribution" is a measure of the contribution the term makes to the document score of the document. The list may contain k tuples, using the same threshold number as before. Or alternatively, some other number of tuples may be stored, for example, based on a percentage of the number of documents containing the term, or based on a threshold contribution value. The contribution may be computed as described above in (3). However, other contribution formulas may also be used. The contribution need only be a function of both the within-document frequency of the term ($f_{D,t}$) and a between-document frequency of the term, such as IDF.

The contribution cache tuples are sorted by the contribution value. Documents are represented by any useful identifier mechanism, such as their document number, pointer, or the like. As used herein, a document may be identified by both indexing and referencing mechanisms, or combinations thereof. The term "document identifier" is used to mean any such referencing value.

Since the contribution value is the greatest influence on the document score of each document, having the documents ordered by contribution means that the documents to which the term most strongly contributes are first available to the system for scoring and retrieval. This is turn provides for highly efficient and fast query processing.

The lookup table contains some number of pointers into the (document, term frequency) tuples in the inverted index for the term. This allows random access to the frequency information for a specific term in any document in the row without having to traverse the entire row of the inverted index to obtain the frequency information.

More particularly, in one embodiment, the lookup table is a primary index to the inverted index. The (document, term frequency) tuples in the inverted index are considered as arranged in blocks, each block having some number of tuples, such 100 tuples. The lookup table then contains the document identifier of, and pointer (or index) to, the first tuple in each block. Thereby any (document, term frequency) tuple in the block may be easily accessed by first a binary search, linear interpolation, or other search technique, into the lookup table given a document identifier, then a reference into the block of the inverted index, and then a scan of the block.

Since the static cache is arranged by terms, it may be stored in the inverted index itself, or provided as a separate file or table. Storage in a separate file provides benefits of decrease search time due to improved locality.

As an optional structure in the static cache, there may be provided a cache index for each term entry. The cache index is a list of indices (0 to the number of tuples) into the contribution cache. Whereas the contribution cache is ordered by the contribution value, the cache index for a term is ordered by the document identifiers. The cache index allows for the rapid determination of whether a given document is found in the contribution cache of a term.

In conjunction with the improved organization of the database as described, the present invention provides improved methods for processing queries. There are two main cases for handling queries: single-term queries and multiple-term queries.

For single-term queries, only the contribution cache needs to be searched. Since there is only one term in the query, for a given document, its entire document score will be a function of that term's contribution, as shown in (2) above. Since documents are already sorted by decreasing contribution in the contribution cache, a first subset of documents, such as the first 10, in the contribution cache can simply be returned as the results of the query, either with, or without computing the document score. This provides a significant performance advantage over conventional systems which must traverse the entire inverted index to score the documents therein.

If the term is not present in the contribution cache, then conventional scoring routines may be used.

The implementation for multiple-term queries is only slightly more complex. Here, a parallel unpack method is used. Each of the term rows in the contribution cache are traversed in parallel, and a document score is determined for the lowest matching document in all of the rows.

In many cases, while traversing the terms of the query, there will almost always be documents that are present in the contribution cache for one term, but not for another. That is, the document will appear in less than all of the query term rows of the contribution cache, and likely, in only one such row. For example, if the query is "apple and orange", there will be an arbitrary document, say document number 1000, that appears in the contribution cache of "apple" but does not appear in the contribution cache of "orange." The present invention provides several mechanisms for determining whether this condition exists and for completing the query.

In one embodiment, since a document identifier is already known, the lookup table for "orange" is searched to find the pointer into the inverted index row of "orange" for the block containing document number 1000. (As explained above, the inverted index rows are sorted by document number. The pointer can thus be efficiently calculated from known starting points, and fixed size fields, or can be searched in various manners). Once referenced into the correct block in the inverted index, only a limited number of entries therein need be expanded until the desired document number 1000 is reached. The document score for this document is then updated from the term frequency information in the inverted index at this point, using the equation (1) set forth above. This process of referencing the lookup table and traversing a limited portion of the term rows in the inverted index is repeated for each term of the document when the document is not found in the contribution cache portion for the term. As long as the lookup table is properly constructed to allow relative efficient random access to (document, term frequency) information, the information retrieval system will have to unpack far fewer (document, term frequency) tuples in the inverted index than it would unpacked if it had iterated over the entire row of the inverted index as in a conventional information retrieval system.

Where the optional cache index is used, this problem may be handled even more efficiently by using the document identifier to search the cache index of a query term. Retrieved cache indices are mapped to the underlying document identifier in the contribution cache. During querying processing, the contribution cache is searched using the cache index, and matching the document identifiers against the given document identifier. If there is a match, then the contribution for the term can be immediately accessed from the contribution cache, without incurring the I/O expense associated with using the lookup tables and the inverted index. This approach substantially increases performance.

However, multiple-term queries introduce another problem. It is theoretically possible for documents that are not present in any of the contribution-caches to have higher scores than some documents in the caches: the uncached document could contain low-contribution terms, but enough of such terms so that their sum exceeds the scores of cached documents (which may contain only a few high-contribution terms each).

Fortunately, the contribution-caches of the present invention entirely solve this problem by identifying a maximum bound on the scores of otherwise unscored documents. As a query is processed, and the term rows of the contribution cache are traversed for the terms of the query, an upper bound document score value is maintained as the combined contributions of the documents (regardless of their document identifer) at a furthest advanced index for the contribution cache rows. Because the contribution caches are sorted in order of contribution value, all unscored documents that remain in the contribution caches will have, at any time, a document score less than the defined upper bound document score. Further, no document that is not in contribution can have a higher document score than this upper bound, because it is already known that the contribution of the terms of the query to the document was so low as to not include the document in the contribution cache of one or more the terms.

Accordingly, while the documents in the contribution cache are being scored, a set of n document scores is maintained, such as the top 20 or 100 document scores, or any number as desired, as the current search results. A minimum document score from this set is maintained, and updated as new documents are scored. Each time the minimum document score is updated, it is compared with the upper bound document score. As long as the minimum document score from the current search results is less than the upper bound, the documents in the contribution cache are scored. Once the minimum document score in the result set is less than or equal to the upper bound, then the document scoring is halted. The search results are guaranteed to include the n highest scoring documents for the query, even though many, perhaps tens of thousands, of documents containing some terms of the query have not even been scored. No other known information retrieval system can guarantee this type of result.

The use of the minimum document score also provides another optional technique for handling documents appearing only is the contribution cache of some terms, and not others. When a document is not present in the contribution cache of a given query term, the document can be stored for deferred processing, along with a maximum possible score for the document. Since the document does not appear in the contribution cache of a query term, the maximum document score can be determined by the lowest contribution value in the contribution cache of the term. Once stored, document retrieval continues with other documents in the contribution caches. The minimum document score of the search results can be compared with the maximum document scores of the stored documents. Only those documents having a maximum document score greater than the minimum document score of the search results need to be further processed and completely scored. In many cases, none of the stored documents need to be scored at all. In either case, significant time and computational efficiency may be achieved.

The present invention provides considerable performance advantages over conventional information retrieval systems. In experiments on a large document database, improvements in retrieval speed and throughput by a factor of 20 or 30 have been experienced, and improvements by a factor of 100 are not uncommon.

The contribution-cache and lookup-table sizes can be tuned to balance retrieval performance against memory requirements. Because the auxiliary structures are typically smaller than the original document/frequency tuples, they can be stored in less main memory. This means that smaller machines can still perform efficient queries on large databases.

Various aspects of the present invention are capable of different embodiments. These include, for example, the particular structural arrangements for a database of documents to include the contribution cache, the random access mechanism and its variants; methods for preprocessing documents in the database to create the contribution caches; methods for processing queries using the contribution caches; database management systems providing the structural arrangements of the static caches, and useful querying processing methods.

The present invention is applicable to a variety of compression schemes within both the primary document/ frequency data structure and the cache and lookup tables themselves. The invention can be extended to handle boolean constraints or other filters. While designed for very large databases, the invention also provides noticeable performance improvements even on relatively small collections.

In addition, while the above scoring function (2), (3) is particularly useful, many other different scoring functions and variations thereof may be used with the present invention, which is independent of any particular scoring function. For example, the invention can easily be extended to handle inverse cosine scaling. Also, the present invention may be usefully extended to information retrieval systems that treat multiple word phrases as single terms, providing an inverted index entry, and static cache for such terms, and allowing searching on the phrases. In such systems, contribution caches are created for the phrase terms, with the appropriate document identifier and term/phrase frequency information.

BRIEF DESCRIPTION OF THE DRAWINGS

FIGS. 4a through 4e illustrate an example of the use of the static cache during query processing in accordance with the present invention.

DETAILED DESCRIPTION OF THE INVENTION

System Architecture

Figure 1:
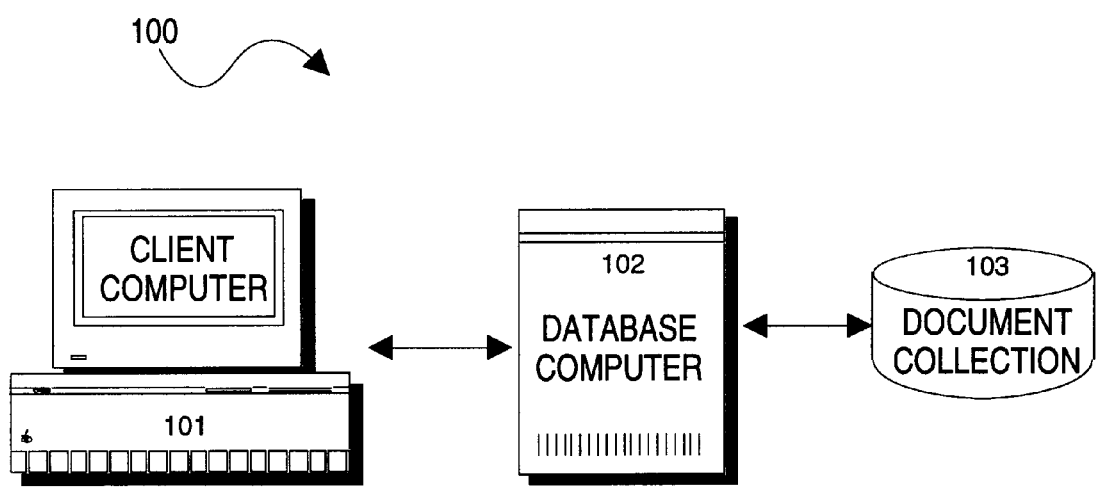
FIG. 1 is an illustration of an information retrieval system in accordance with the present invention.

Referring now to FIG. 1, there is shown the architecture of one embodiment of a system in accordance with the present invention. In system 100, there is at least one client computer 101 (or "client"), and a database computer 102, communicatively coupled over a network, preferably the Internet, or other similar wide area networks, or even local area networks, as the actual network architecture is not material to the present invention. The database computer 102 is coupled to and controls a document database 103.

In this embodiment, a client computer 101 is of conventional design, and includes a processor, an addressable memory, a display, a local hard disk (though diskless computers may also be suitably used), input/output ports, and a network interface. The display is of conventional design, preferably color bitmapped, and provides output for a graphical user interface for software applications thereon. The input/output ports support input devices, such as a keyboard, mouse, and the like, for inputting commands and data. The client computer 101 executes a conventional operating system. A conventional network interface to a network provides access to remotely situated mass storage devices, along with access to the Internet, with a TCP-IP type connection, or to other network embodiments, such as a WAN, LAN, MAN or the like. In the preferred embodiment the client computer 101 may be implemented on a Intel-based computer operating under Microsoft Windows® operating system, or equivalent devices. A client computer 101 executes some form of client application that interfaces with the database computer 102 to request and receive documents therefrom, and display such documents to the user.

A client computer 101 executes some form of client application that interfaces with the database computer 102 to provide user queries thereto and receive documents satisfying such queries therefrom, and display such documents to the user. In the preferred embodiment where the database computer 102 is accessed over the Internet or World Wide Web, the client application is adapted for communication via the Hypertext Transfer Protocol, and further adapted for decoding and displaying HTML documents. The client application may be a database frontend, a World Wide Web browser, or other similar applications, executing conventionally in the local memory of the client computer 101. It is anticipated that in a preferred embodiment, the client computer 101 may be personal computer as used by an end user, whether in their home or place of employment, in order to access documents and information stored in the document databases 103 distributed on the Internet or other network.

In terms of hardware architecture, the database computers 102 are conventional server type computers, preferably supporting a relatively large number of multiple clients simultaneously for handling search and document requests, and other processing operations. The database computers 102 may be implemented with Intel-based personal computers, or other more powerful processors, such as various models of Sun Microsystems' SparcStations, operating under their UNIX implementation. The database computers 102 provide one or more conventional processors, and a suitable amount of RAM, preferably on the order of 18–64 Mb.

Figure 2:
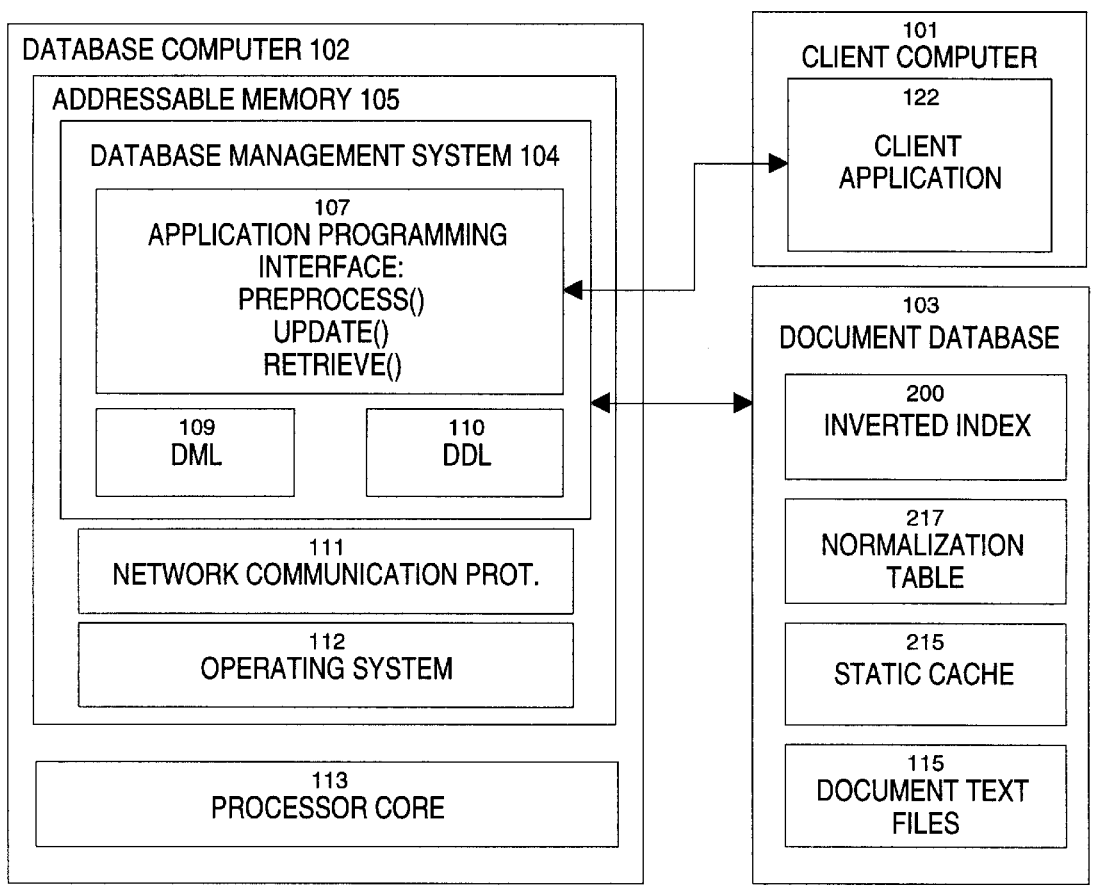
FIG. 2 is an illustration of the software architecture of the database computer and document database in accordance with the present invention.

Referring to FIG. 2, in terms of software architecture, in accordance with the present invention, each database computer 102 comprises a database management system 104, having a DDL 110 and DML 109 for defining and manipulating the document database 103. In addition, the database management system 104 is adapted in accordance with the present invention to provide an application programming interface 107 with preprocessing, update, and retrieve methods. The preprocess method creates the static cache for an existing database 103 of documents. The update method updates the static cache as new documents are added to the database 103. The retrieve method provides for query processing adapted to the static cache of the present invention. Client applications 122, of whatever type, hold the necessary interfaces to the database management system 104, typically for invoking the retrieve method. The database computer 102 further includes a network communication protocol 111 for handling communication with multiple client computers 101. A conventional operating system 112 is also present. These software elements operate conventionally in the addressable memory 105 of the database computer 102. Those of skill in the art will appreciate that the database management system 104 with an application programming interface 107 supporting the present invention may be provided to the database computer 102 as a software product on a computer readable media, such as CD-ROM, 8 mm magnetic tape, or the like, for installation and execution thereon.

The document database 103 coupled to a database computer 102 may have any useful internal architecture or schema. The document database 103 preferably accommodates anywhere from several thousand to in excess of 1 million documents, providing persistent storage thereof in a set of document text files 115. The document database 103 is preferably relational, though object oriented, or network database architectures may also be used. Support for conventional structured query languages is also preferred.

The database 103 may employ any of a variety of document representation techniques. Generally, document representation in accordance with the present invention includes the use of document vectors. A document vector may be constructed as a set of (term, term frequency) tuples. In addition, a document is associated with its full text in the text files 115. In some embodiments, the actual document vector may be created and stored for the document. In other embodiments, the document vector may be created as needed during the execution of a query.

In one preferred embodiment, the document database 103 persistently maintains an inverted index 200, a static cache 215, and a normalization table 217. These elements are preferably persistently stored in the storage media of the database 103, such as hard disk, optical disk, or the like. During operation, all or selected portions of these elements may be usefully copied into the addressable memory 105 of the database computer 102 for improved performance. In particular, the static cache 215 is copied to memory for high speed query processing.

Figure 3A:
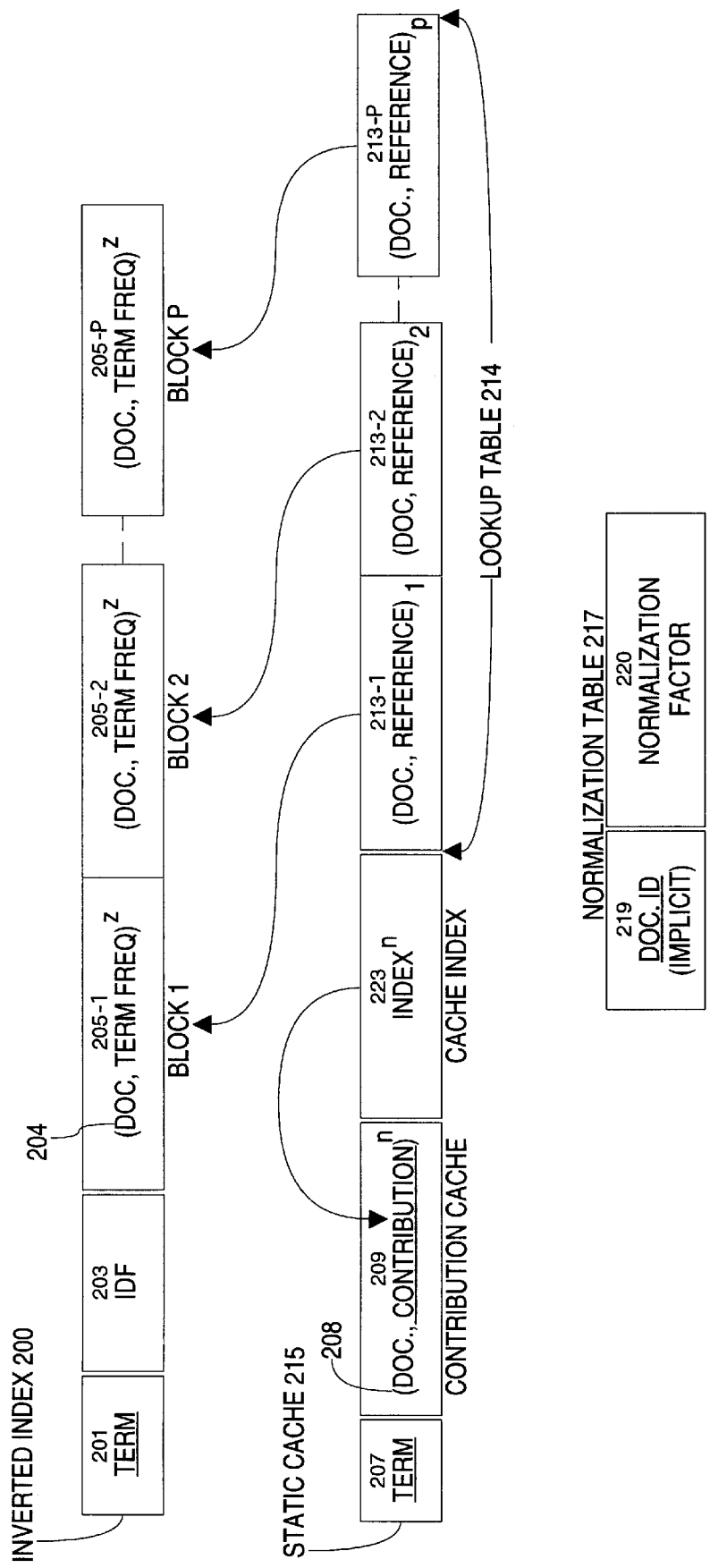
FIG. 3a is an illustration of the static cache including the contribution cache, lookup tables, and cache index.

FIG. 3a illustrates elements of one embodiment of an inverted index 200 and static cache 215 for use with the present invention. Other more complicated inverted indices supporting compression, and other attributes of the documents may be used. Inverted index 200 includes an ordered (typically alphabetically) table of terms 201, each term being one of the unique terms in the database 103. Multiple word phrases, such as "intellectual property", may also be included as individual terms in the inverted index 200, to allow for phrase searching. Each term 201 is associated with at least one, typically many (document, term frequency) tuples 204. The document is uniquely identified by some identifier, using an identification scheme, and not the full text of the document itself, which is stored in the text files 115. The term frequency describes the number of occurrences of the term in that document. The (document, term frequency) tuples 204 are ordered by the identifiers of the documents. In an embodiment without any compression techniques applied, each tuple requires typically 6 bytes, 3 bytes for a document identifier (sufficient to identify $2^{24}$ documents) and 2 bytes for the frequency, sufficient for up to 65,536 occurrences of a term in a document. Differential compression may be used to reduce these memory requirements. Those of skill in the art will appreciate that other information may also be stored in the tuples of the inverted index 200.

In accordance with one embodiment of the present invention to support one version of the lookup table, the (document, term frequency) tuples 204 are grouped into blocks 205. There are p such blocks 205 (block 1 through block p). Each block 205 contains some number z of the tuples 204. The number is preferably predetermined and fixed. In one embodiment, each block has about 1000 tuples 204. Alternatively, variable sized blocks may be used.

In addition, each term 201 in the inverted index 200 has an associated inverse document frequency (IDF) 203 that describes the relative significance of the term in the database 103. The IDF 203 of a term 201 may be computed in any of a variety of manners, the particular implementation of which is not limited by the present invention. One simple and useful definition of the IDF of a term T is:

$$IDF_T = \log\left(\frac{N}{n_T}\right) \quad (4)$$

where N is the number of documents in the database 103, and $n_T$ is the number of documents in the database 103 that contain at least one occurrence of term T. Other more complex definitions of IDF may be used with the present invention.

In accordance with the present invention, database 203 further includes a static cache 215. The static cache 215 is ordered by a set of terms 207. These terms are selected from the inverted index 200 as those for which the total number of (document, term frequency) tuples 205 exceeds a predetermined threshold. The threshold may be established with respect to the total number of documents in the database, or other criteria. In the preferred embodiment, thresholds between 500 to 2000 are found to be useful. The threshold value is called k. Thus, the set of terms 207 in the static cache 215 is a subset of the set of terms 201 in the inverted index 200.

For each of these terms 207, there is a contribution cache 209 of (document, contribution) tuples 208. In a preferred embodiment n tuples are stored. N may be determined in a variety of manners, not limited by the invention. In one embodiment, n is equal to k. Alternatively, n may be a percentage of k, based on the number of documents in the database. Also, n may vary between contribution caches 209. For example, the number of tuples may dynamically result from the use of a contribution threshold value, such that tuples 208 are created only for those documents for which the contribution of the term 207 exceeds a predetermined threshold. This limits the tuples to including only a certain range of documents with a known degree of relevance to the term. For convenience of notation, the examples herein will assume that n=k tuples are stored, but it is understood that n can be determined in any of the foregoing, or in other manners. Also, "document" here is understood by those of skill in the art to mean that some identification scheme is used to identify a document, and that the text of the document itself is not stored in the tuple.

The tuples 208 are ordered by the descending value of the contribution. The contribution is the contribution of the term to a document score for the identified document. The contribution is preferably computed as shown above in (3) and reproduced here:

$$c_t = \frac{f_t IDF_t}{l_D} \quad (3)$$

The static cache 215 further includes a lookup table 214 for each term 207. The lookup table 214 includes a number of (document, pointer) tuples. Where there are p blocks 205 in the inverted index, there are p (document, pointer) tuples 213. The document is the document identifier of the first (document, term frequency) tuple 204 in corresponding block 205 for the term in the inverted index, and the pointer references the memory location of the block, or alternatively indexes the offset of the block in the row. In either case, the lookup table 214 enables the database management system 104 to easily access the tuples 204 in the block 205 for a given document in order to score the document during query processing. Typically, this is done by a binary search, or other technique, through the lookup table 214 for the corresponding block containing the document identifier. Access is then made to the block in the term row of inverted index 200. The block is traversed until the given document identifer is located. A document score based on the term is then computed from the term frequency information in the (document, term frequency) tuple 204.

When applied to an existing database for the first time, the preprocess method of the database management system 104 is used to create the static cache 215. In a simple embodiment the preprocess method creates each contribution cache 209 by selecting those term rows of the inverted index 200 that have more than k (document, term frequency) tuples 204. For each selected term, the preprocess method creates a contribution cache 209 entry and stores the term. The preprocess method then traverses the documents in the term row to determine the contribution of the term to the document according to its frequency in the document. For computational efficiency the documents are ranked by contribution as the contributions are being determined, for example in any of a variety of tree data structures, such as AVL trees, splay trees, or the like, for storing the n highest ranking documents by contribution. Once all documents in the term row are processed, the n tuples 208 are stored from this data. Alternatively, all of the contribution values for a term may be determined first, ranked, and then the n documents with the highest contribution values selected. The preprocess method then creates the lookup table 214 for the term by traversing the blocks of the term row in inverted index 200 and storing the (document, pointer) pair 213 information for the appropriate blocks. Again, this process may be done in line while scanning the term row for computing term contributions.

The contribution cache 209 for each term 207 is preferably updated in conjunction with the inverted index 200 when a document is initially processed and entered into the document database 103. This may be achieved with the update method, or similar operations. Generally, the document text is iterated over, the unique terms in the document identified, along with their frequencies. The IDFs of terms, and the (document, term frequency) tuples 204 are then updated in the inverted index 200, as are the contributions of each of the terms to the document using (3). The (document, contribution) tuples 208 are then updated, by re-ordering the tuples 208 on the basis of the new contributions for terms in the document, disgarding tuples 208 if necessary so that n tuples always remain. Any changes in the term row for the inverted index 200 that effect the block orderings are updated to the lookup table 214 of the term in the static cache 215.

Figure 3B:
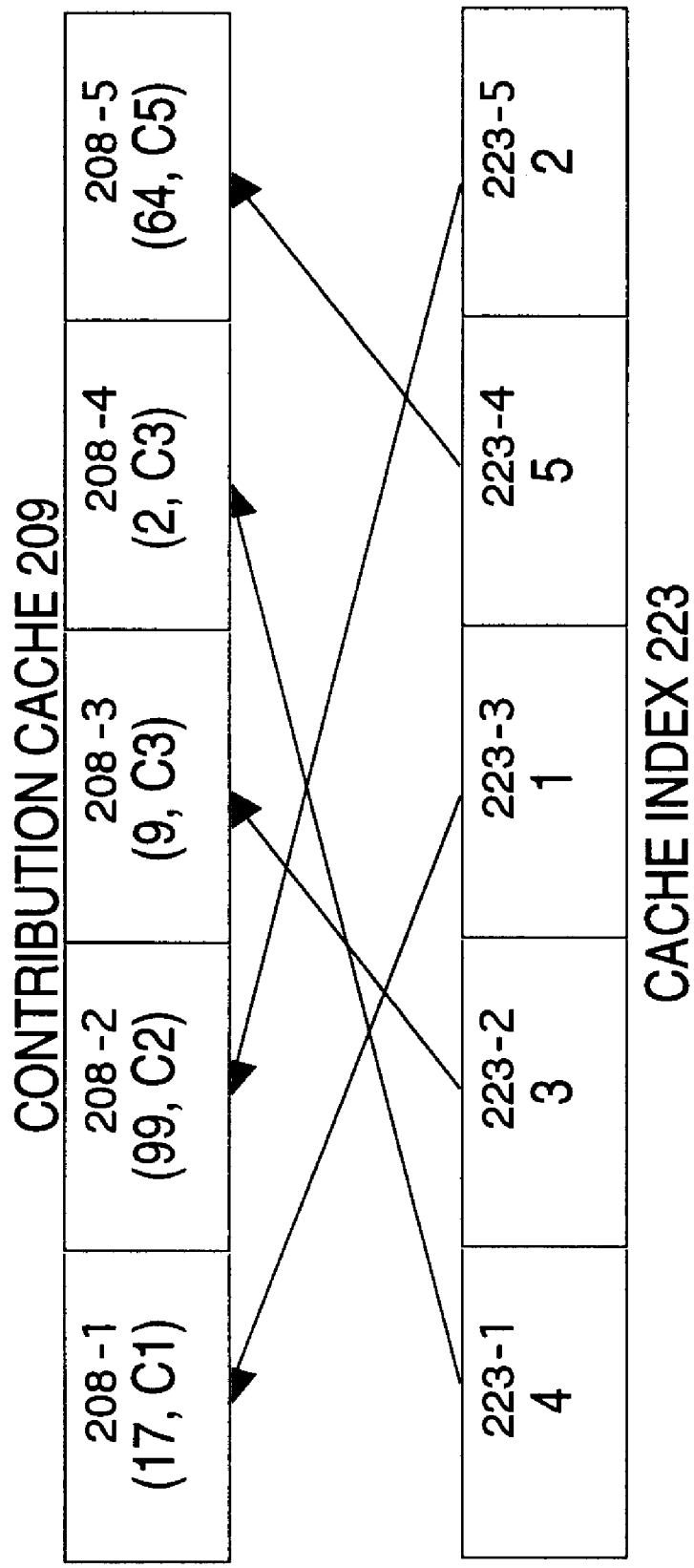
FIG. 3b illustrates an example of the cache index.

As a further optional enhancement to the database structures illustrated in FIG. 3a, a cache index 223 may be associated with each contribution cache 209. The cache index 223 contains nindex entries, each entry storing an index to one of the tuples 208 in the contribution cache 209. These entries are ordered not by the value of the index, or the contribution, but rather, by the values of the document identifier in the respective tuples 208. FIG. 3b illustrates a simple example, with a contribution cache 209 having 5 tuples 208, and the accompanying cache index 223. The entries 223-1 to 223-5 include the index values to tuples 208-1 through 208-5, and are ordered by the document identifiers in the tuples. This cache index 223 is optionally consulted during query processing, by looking up the document identifier for a particular index entry, and matching it with a previously determined document identifier. This enables very rapid determination of whether a document is present in the contribution cache of a given term, without having to incur the input/output overhead and time delay associated with using the lookup tables 214 and inverted index.

Those of skill in the art will appreciate that the structures of FIG. 3a and 3b are merely descriptive of one embodiment useful for explaining and practicing the present invention, and that many other variations and implementations may be used to achieve the results and benefits of the invention.

Query Processing

Referring now to FIGS. 4a through 4d, there are shown illustrations of the contribution caches 209 and lookup tables 214 of the static cache 215 for explaining the processing of queries using the database structures in accordance with the present invention. In these figures, there are three rows, each representing a term in a user's query, the query being "apple orange banana". For each term there is shown a portion of the contribution cache 209 having the (document, contribution) tuples 208. For example, the first tuple 208 in the contribution cache 209 of "apple" is document 63. Being the first document, its contribution c is the highest at 0.98, meaning that the term "apple" contributes to the document score of this document more than it contributes to the document score of any other document. Note that the scaling of the contributions here are arbitrary. Also, as described above, there would be anywhere from about 500 to 2,000 or more entries in each of the contribution caches 209. The cache indices 223 are not shown in these figures.

For each term there is shown a portion of the lookup table 214 for the term, here indexed to blocks of 50 entries in the inverted index 200. Each lookup table 214 has (document, pointer) tuples 213. Note that the pointer values are merely indicated by the letter "P", and again, would point to, or index to, different portions or offsets in the respective term rows of the inverted index 200. As described above, there would be p entries in the look up table 214, where p is the number of blocks in each row of the inverted index 200.

Also illustrated is the result set 301 that stores a limited number of documents sorted by document score. The size of the result set 301 may be determined on demand when the user submits the query. Typically, the result set 301 includes the top 20 to 100 documents located in response to a query.

Initially the result set 301 is empty, and new documents and document scores are added until the limit is reached. The document score of the last entry in the result set 301 is usefully stored in the minimum document score 302; alternatively, it may be directly accessed as needed from the document score of the last entry in the set 301. As more new documents are scored, if their document score is below the minimum document score 302, then the score is disgarded, and the document is not added to the result set 301.

Finally, an upper bound document score 303 is also maintained.

A query processing method increments a cache counter 305 over each column of the (document, contribution) tuples 208 listed in contribution caches 209, in order to score the documents identified in the contribution caches 209 of each of the query terms in a parallel manner. The score of a document is based on the contribution of a query term to the document as found in the contribution cache 209 for the term, and on the term frequencies of the other query terms in the document. These term frequencies may be found by looking up the block that "contains" the document in the lookup table and another query term, and obtaining the frequency information from the term row of that other term in the inverted index. Alternatively, a document score may be determined by using the cache index 223 of a query term to search the contribution cache 209 of the term, for the document, and using the term contribution therein to compute the document score. As documents are scored the results are placed in the result set 301 if the document score is greater than the minimum document score 302, and the minimum document score 302 is updated from this as well.

The process is terminated whenever the minimum document score 302 is greater than the upper bound document score 303. The upper bound document score 303 is the sum of the contributions of the documents at the current cache counter 305 across the contribution caches 209 of all the query terms. More precisely, for a cache counter i, and contribution caches j for T query terms, the upper bound document score $U_i$ is:

$$U_i = \sum_{j=1}^{T} c_{j,i} \quad (4)$$

The process can terminate on this basis because no unscored document that is in any contribution cache at a location greater than the current cache counter 305 (or not even present in the contribution caches at all) can have a document score that is greater than the upper bound document score 303. Thus, when the upper bound document score 303 becomes less than the minimum document score 302 in the result set 301, there is no further need to score documents. The result set can therefore be returned to the user.

Figure 4A:
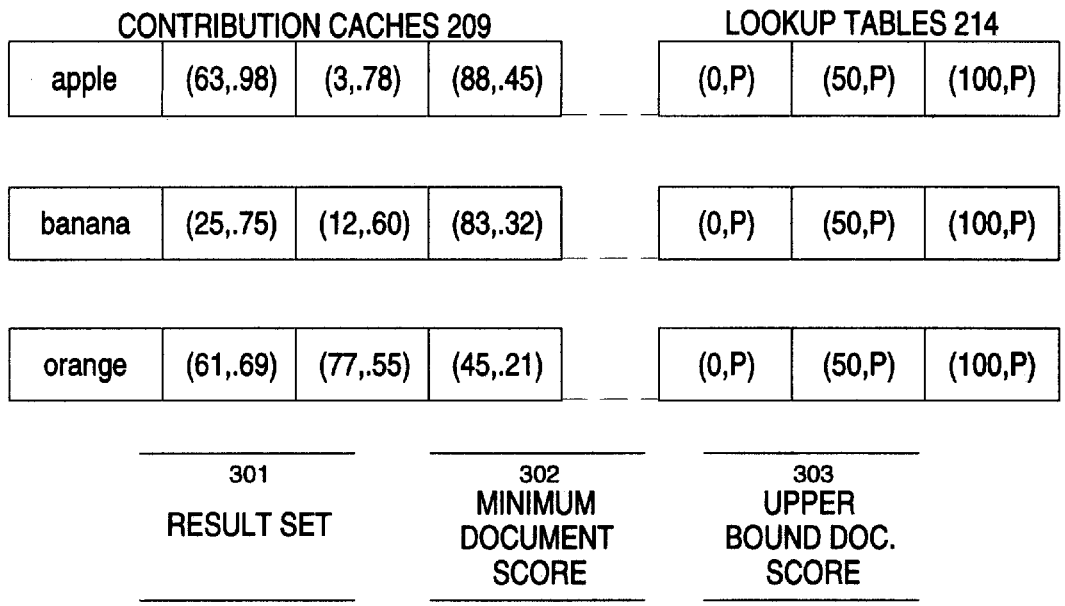
Figure 4B:
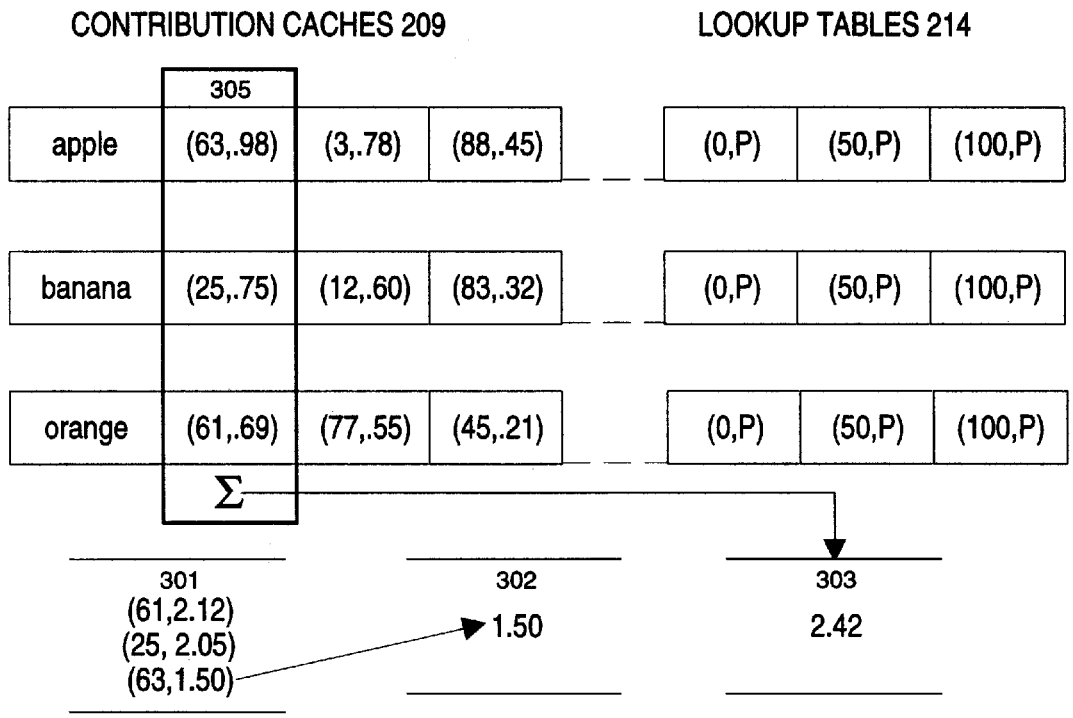
Figure 5A:
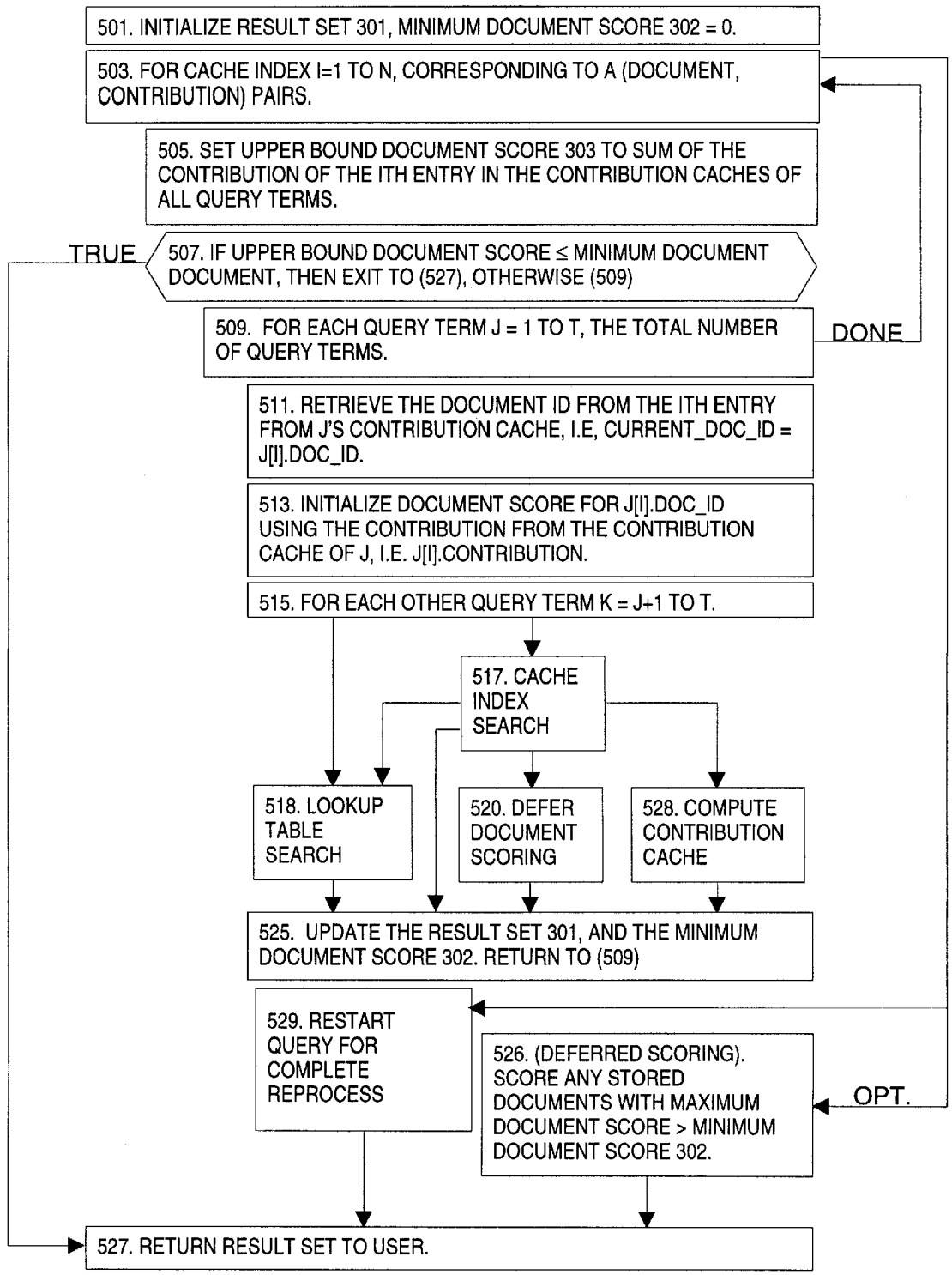
FIGS. 5a, 5b, and 5c, are flowcharts of various methods of query processing in accordance with the present invention.
Figures 5B, 5C:
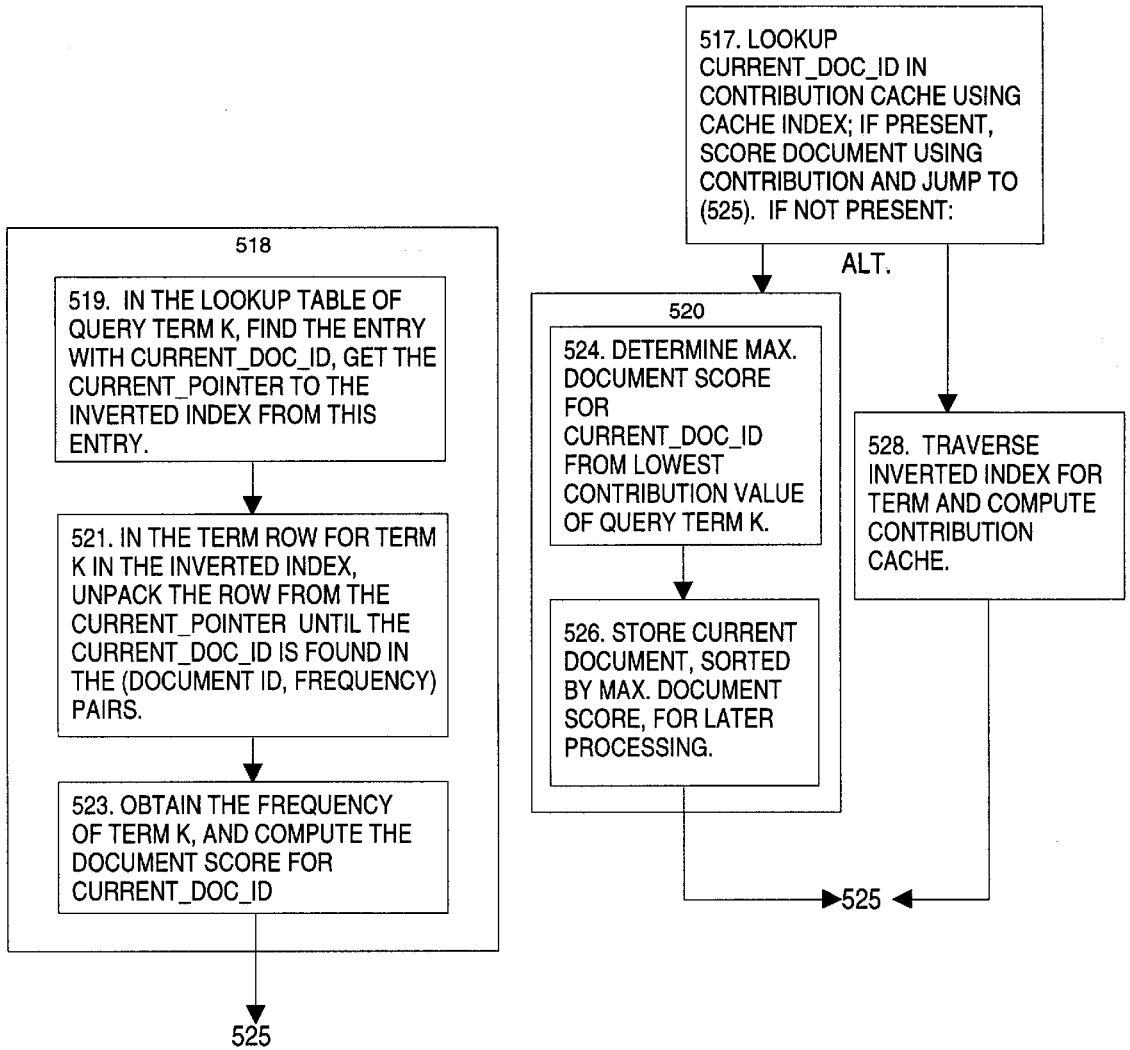

FIGS. 5a, 5b, and 5c illustrates flowcharts for various methods of query processing in accordance with the present invention. These methods are managed by the database management system 104, typically by an implementation of a retrieve() method provided in the application programming interface of the database management system 104. FIGS. 4b through 4d will be used to explain these operations by way of an example.

Referring now to FIG. 5a, the minimum document result 302 is initialized to 0, and the result set 301 is also initialized 501.

The retrieve() method then begins traversing the contribution caches 209 by incrementing 503 a cache counter 305 over the number n of (document, contribution) tuples 208 in a contribution cache 209. The initial position of the cache counter 305 is shown in FIG. 4b with the cache counter 305 covering the first entries in the contribution caches 209.

The upper bound document score 303 is set 505 to the combined value of the contributions of the $i^{th}$ (document, contribution) tuples 208 in the contribution caches 209 all the query terms, as per (4). In FIG. 4b, the upper bound document score 303 is 2.42, equal the summed contributions of all of the first contribution cache tuples for the query terms. As cache counter i is incremented, this value will change, typically dropping slightly with every increment.

The upper bound document score 303 is compared 507 with the minimum document score 302. Since it is greater (2.42>0) the process continues.

Now the query terms are iterated over 509, for each query term j, from 1 to T, the total number of query terms.

The identifier of the current document is retrieved 511 from the $i^{th}$ entry in the contribution cache 209 of query term j (j[i].doc_id); this becomes the current_doc_id. This is the identifier of the document that is to be scored. In FIG. 4b, this would be document 63, from the first (document, contribution) tuple 208 for the first query term "apple", thus setting the current_doc_id to 63.

The document score for document 63 is initialized 513 using the contribution (here 0.98) in a scoring function, for example as set forth in (2):

$$S_d = \sum_{i=1}^{t} W_t c_t \quad (2)$$

This establishes the first component of document 63's score, that contributed by the query term "apple."

Now the score of document 63 is updated with respect to the other query terms, "banana" and "orange," in one of various implementations. In one approach, the retrieve method scores each of the query terms on the current document by searching 518 the lookup tables 214 of the query terms, and accessing the term frequency information from the inverted index entry for the document and the term. This technique is illustrated in FIG. 5b as operations 519–523, and in FIGS. 4b–4e. In a second approach, the cache index 223 and contribution cache 209 of the query term is searched 517 to identify the current document in the contribution cache 209. The document is then scored by the term contribution. This technique is illustrated in FIG. 5c. Depending on the results of the cache index search 517, various other operations may be undertaken, as further described below.

The lookup table search 518 is discussed first. Here, the retrieve() method loops 515 over these other terms using loop variable k. For "banana", the current_doc_id, here 63 for the first document, is found 519 in the lookup table 214, as being in the block beginning with document 50. This finding operation may be done by linear search, binary search, linear interpolation, or other efficient means, the particular implementation not being limited by the present invention.

However the entry is found, the current_pointer is taken from this entry, here P. In the example of FIG. 4b, for document 63, this pointer references the memory location in the inverted index 200, for the $50^{th}$ block 205 for the term "banana." Beginning from this block and traversing 521 forward, there will be found (since these entries are ordered by document identifier) the (document identifer, term frequency) tuple for document 63. The frequency of the term "banana" is obtained 523 and the document score for document 63 is updated 525 with the scoring function using this term frequency information.

Note that although document 63 does appear in the contribution cache 209 of "banana" this entry was not used here to score the document in this embodiment. An embodiment that does search the contribution cache 209 using the cache index 223 is described below.

Now the document score for document 63 is updated for the term "orange." As before, the lookup table 214 for "orange" is searched 519 to get the pointer to the block 205 in the term row for "orange" in the inverted index 200 that contains the (document, term frequency) tuple 208 for document 63, and the term "orange". This frequency information is then used to update 523 the document score for document 63. For the sake of illustration, the document score of document 63 is assumed to be 1.5.

Once all of the query terms have been processed, then the document score for document 63, and the document is placed 525 in the result set 301, and the minimum document score 302 is updated to 1.50, here since there is only one entry, with the document score of document 63.

The process then returns to the next contribution cache 209 at the current cache counter 305 of 1, this being document 25 in first entry for the term "banana", and repeats, scoring document 25 on each of the query terms. Again, the lookup tables 214 of "apple" and "orange" will be respectively searched 519, and the inverted index rows for these terms traversed 521 for the (document, term frequency) tuple 208 for document 25. Next document 61, the first document in the contribution cache 209 of "orange" will be scored in the same manner. Each time, the result set 301 and minimum document score 302 is updated. The result set 301 of FIG. 4b shows assumed document scores following the scoring of these three documents, 63, 25, and 61.

Referring now to FIG. 4c, once document 61, the last document in the first window of contribution cache tuples 208 for cache counter=1 has been scored, the process returns to 503, which increments the cache counter to 2. The upper bound document score 303 is set 505 to the combined sum of the contributions again, here 1.93. The minimum document score 302 of 1.50 is still less than the upper bound document score 303, so the process continues as above, this time scoring document 3, and updating the result set 301, and minimum document score 302. Referring to FIG. 4d, it is assumed that document 3 has a document score of 3.36. This process continues as described, resulting in document scores for documents 3, 12 (with an assumed score of 1.65) and 77 (with an assumed score of 2.68).

As each document is scored, the result set 301 is updated 525 with the documents, and their scores, placing them in ranked order. For the purpose of this example, it is assumed that the result set 301 is constrained to the top five entries, though in practice the top 20 or 100, or some other larger limit is used. The minimum document result 302 is likewise updated 525, here with document score 1.65 from document 12, thereby eliminating document 63 with a score of 1.50 from the result set 301. This state is shown in FIG. 4d.

Referring now to FIG. 4e, there is illustrated the mechanism by which the minimum document score 302 and the upper bound document score 303 are used to prune the query process, while ensuring that the result set 301 has all possible documents that could have significantly meaningful document scores. In FIG. 4e, the cache counter 305 is 503 incremented to the next entry (the third column), as shown, and the upper bound document score 303 is here computed 505 to be 0.98.

Also shown in FIG. 4e are the contribution cache tuples in heavy outline that are at cache counter values greater than the current cache counter, but that include documents that have been previously scored. For example, in the contribution cache 209 for "orange," there appears a (document, contribution) tuple 208 for document 63. This document was the first document scored as it appeared earlier in the contribution cache 209 of "apple." The entries without outlines indicate documents that have not been scored.

Now at 507, since the upper bound document score 302 of 0.98 is less than the minimum document score 302 of 1.65, the process terminates and returns 527 the result set 301 to the user, performing any necessary post-query processing, such as obtaining document titles, locations, and the like. The result set 301 is guaranteed at this point such that no unscored document anywhere in the database, whether it has all, some, or none of the terms of the query, can have a document score greater than the upper bound document score 303.

First, of the documents at cache counter values greater than the present cache counter of 3, that is, documents to the "right" of the cache counter 305 in FIG. 4e, some of these documents, the heavily outlined entries as noted above, will have been previously scored, and their document scores accounted for in the result set 301, and the minimum document score 302.

Thus, the only documents of interest are those that have not been scored. By (2) and (3) above, the document score is based on the contribution of the query terms. However, the contributions of the query terms have already been determined and stored in the contribution caches 209. The upper bound document score 303 is the greatest possible value of the contributions of such terms in the remaining documents, since they must all have lower contribution values individually then the contributions at the current cache counter. If they had higher contribution values, then they would have been ranked higher in the contribution caches, and hence already processed and scored. If a document containing any of the terms of the query is not even present in the contribution caches, then clearly the contribution of the query terms to the document score was minor (i.e. the document did not rank in the top k entries based on any of the terms' contributions). Where a query term is missing from the document the contribution of that term to the document score is 0, and so cannot increase the overall document score. Thus, once the minimum document result 302 from the result set 301 becomes greater than the upper bound document score 303, it is not possible for any unscored document to have a document score sufficient to include the result set. Therefore the query can be terminated.

This ability to terminate the query based on the upper bound document score and minimum document score dramatically reduces retrieval times. As will be appreciated by those of skill in the art, the time taken to traverse even most of the entries in the contribution cache (e.g. 1750 out of 2000 entries) of a given query term will always be less then traversing the entire term row (e.g. with 20,000 entries in a database of 1,000,000 documents) in the inverted index for such terms, both because of the fewer number of entries, and because the contribution cache is held in local memory and therefore has a considerably lower I/O cost then accesses to the inverted index, which is likely stored on disk. If the query can be terminated before the contribution cache 209 is exhausted, the retrieval times will always be better than conventional systems.

Note however, in some cases, the cache counter 305 may be incremented through all entries in the contribution cache 209. If this occurs without the upper bound document score 303 falling below the minimum document score 302, then there are documents remaining in the database that may have higher document scores than the minimum document result 302. Accordingly, one alternative is to restart 529 the query processing using conventional search techniques. The accumulated result set 301 may be passed to the conventional search technique or disgarded, if query processing techniques are often highly optimized for the handling of search results.

Referring again to FIG. 5a, an alternative method for overcoming the problem of documents that do not appear in the contribution caches, and that are unscored, is the cache index search 517. This approach is based on the the optional use of the cache index 223. In this alternative approach, for each contribution cache 209 there is a cache index 223 as described above. Referring to FIG. 5c, given the document identifier of the current document, current_doc_id, the cache index 223 is searched 517, by selecting an index entry, the $r^{th}$ index, in the cache index 223, and comparing the document identifier of the $r^{th}$ tuple 208 in the contribution cache of the $k^{th}$ query term to the current document identifier. If there is a match, then the document score of the current document is updated directly for this query term using the contribution value from the tuple 208, as per (2), and the result set 301 is also updated 525, as shown in FIG.

5a. If there is no match, then the cache index 223 is searched, using a search technique such as binary search, linear interpolation or the like to determine the next index entry to evaluate. Such search techniques are possible because, as noted above, the indices are ordered by the document identifiers of their respective tuples.

If the current document identifier is not located in the contribution cache 223 of the $k^{th}$ query term, then processing continues in one of two manners. In one embodiment, the current document is not further scored on the terms of the query, but rather processing of the document is deferred 520. Since the document did not appear in the contribution cache 209 of the query term, it may be a relatively low scoring document, compared with other documents that have all of the terms of the query. Referring again to FIG. 5c, for deferred processing 520, a maximum document score is determined 524 for the document using the contribution from the last tuple 208 of the contribution cache of the $k^{th}$ query term. The document is then stored 526 with this maximum document score. The stored documents are ordered by their maximum document scores. Processing continues with the next document. The stored documents will be later evaluated, once all of the terms of the query and documents in the contribution caches 209 have been evaluated.

Once the query terms in the contribution cache 209 have been processed, there will be a known minimum document score 302 from the result set 301. This minimum document score 302 is compared with the maximum document scores of the queued documents, and only stored documents having a maximum document score greater than the minimum document score 302 of the result set 301 need be further evaluated 526 with respect to all of the query terms. The reason for this is that if a maximum document score of a document is less than the minimum document score 302, then obviously this is not a document that would have been included in the result set 301 to begin with, and so need not be scored on the remaining query terms. Deferring processing of these documents further reduces the time needed to identify a complete set of highly relevant documents in response to the query.

In an alternate embodiment, when a document does not appear in the contribution cache 209 of a term, then the contribution cache 209 can be updated 528 on demand with the term contribution for the document for the remaining terms of the query. This allows subsequent queries to be processed, having the contribution information available in the contribution caches 209.

In summary, the present invention provides an improved organization and arrangement for a document database along with various complementary query processing techniques that dramatically improve retrieval times, and guarantee the completeness of the search results.

I claim:

1. In an information retrieval apparatus including a database of documents, each document having a plurality of terms and a unique document identifier, the information retrieval apparatus further including a programmed processor adapted to receive a query containing at least one term and to compute in response to the query a document score for each of a selected plurality of documents, the document score being a function of the terms of the query, a computer memory readable by the processor and comprising:

a first ordered plurality of unique terms, each unique term associated in the memory with:

a plurality of (document, term contribution) tuples, the term contribution computed by the processor prior to the receipt of some query containing the unique term and being a scalar measure of the contribution of the unique term to a document score computable by the processor for the document after receipt of a query containing the unique term, the tuples selected for those documents having the highest term contributions for the unique term from all documents in the database, the tuples ordered by the term contribution, such that the processor serially accesses a first subset of the tuples to compute a document score for each document in the first subset of tuples associated with a received term of a query.

2. The computer readable memory of claim 1, wherein the term contribution $c_t$ of a unique term t to a document D is determined according to:

$$c_t = \frac{f_{D,t} IDF_t}{l_D}$$

where:

$f_{D,t}$ is a frequency of the term t in document D;

$IDF_t$ is an inverse document frequency of the term t in the database; and, $l_D$ is a normalization factor for document D.

3. The computer readable memory of claim 1, further comprising:

an inverted index having for each unique term in the database, a plurality of (document, term frequency) tuples ordered by document; and, in association with each of the first plurality of unique terms, a random access mechanism for accessing in the inverted index the term frequency of the unique term in any document in the tuples, to provide the processor with the term frequency for computing a document score for the document.

4. The computer readable memory of claim 3 wherein:

each of the plurality of (document, term frequency) tuples in the inverted index is arranged into a plurality p of blocks, each block having a number (document, term frequency) tuples, each block further having a first such tuple; and, the random access mechanism comprises, for each unique term in the first plurality of unique terms, a lookup table having a plurality of entries, each entry identifying a document of the first tuple in one of the p blocks, and having a reference to a location in the inverted index of a beginning of the one block, such that any document in one of the tuples for a given unique term can be determined to be in exactly one of the plurality of p blocks in the inverted index for the same unique term.

5. The computer readable memory of claim 1, further comprising:

for each plurality of (document, term contribution) tuples associated with a unique term, a respective plurality of indices to the tuples, the indices ordered by identifiers of the documents.

6. The computer readable memory of claim 1, wherein the plurality of tuples for a unique term is determined as a function of the number of documents having the unique term.

7. The computer readable memory of claim 1, wherein the plurality of tuples for a unique term is determined as a function of a threshold value of the contribution of the term to the document.

8. A computer implemented method of processing a query containing a single term, the method comprising:

storing a first ordered plurality of unique terms, each unique term associated with:

a plurality of (document, term contribution) tuples, the term contribution computed prior to the receipt of the query containing the unique term and being a scalar measure of the contribution of the unique term to a document score computable for the document after receipt of the query containing the unique term, the tuples selected for those documents having the highest term contributions for the unique term from all documents in the database, the tuples ordered by the term contribution;

matching the single term to one of the plurality of unique terms;

in the tuples associated with the matched unique term, determining for a number of the tuples, a document score for the document in the tuple from the term contribution in the tuple; and, returning as the results of the queries, the documents from the number of tuples that have been scored.

9. A computer implemented method of processing a query containing a plurality of terms to identify documents in a database in response to the query, the method comprising:

prior to the receipt of the query, determining for each of a plurality of terms a contribution of the term to a document score of each of a plurality of documents, the contribution of a term based on a frequency of the term in the document and a frequency of the term in the database;

receiving the query; and, for each term of the query, scoring a plurality of documents from the determined contribution of at least one term, and from frequency information for any remaining terms of the query.

10. The computer implemented method of claim 9, wherein determining for each of a plurality of terms a contribution of the term to a document score of each of a plurality of documents comprises:

selecting a plurality of unique terms, each of which appearing in more than k documents in the database;

for each of the plurality of unique terms:

determining the contribution of the term to a document score for each document containing the unique term;

selecting a plurality of the documents; and, storing each of the selected documents and contributions in association with the term, the documents ordered by the contribution.

11. The computer implemented method of claim 10, wherein scoring a plurality of documents, comprises for each term of the query:

searching in the documents stored in association with the term, and determining for each of a first subset of the documents a document score based on the contribution of the term to the document, and upon frequency information for other terms of the query;

ranking the documents by their document scores; and, returning a selected number of highly ranked documents.

12. The computer implemented method of claim 11, further comprising:

prior to the receipt of the query, and for each of the plurality of unique terms:

storing in an inverted index a plurality of first entries, each first entry identifying a document and having a frequency of the unique term in the document; and, storing in association with the unique term a lookup table including a plurality of second entries, each second entry identifying a document in a first entry in the inverted index, and having a reference to a location of the first entry, for obtaining from the inverted index frequency information for the term.

13. The computer implemented method of claim 9, wherein scoring a plurality of documents from the determined contribution of at least one term, and from frequency information for any remaining terms of the query, further comprises:

for a term of the query for which the contribution of the term to documents was not determined prior to the query:

determining the contribution of the term to a plurality of documents and storing the contribution of the term with respect to each of the documents; and, scoring at least one document using the newly determined contribution of the term.

14. The computer implemented method of claim 9, wherein scoring a plurality of documents further comprises:

responsive to at least one document for which a contribution of a query term was not determined prior to the query, suspending scoring of the document with respect to the query term and other query terms, determining a maximum document score for the document, and storing the document with maximum document score in a first set;

completing the scoring of other documents with respect to terms of the query, to produce a second set of documents having a minimum document score; and, for only those documents in the first set that have a maximum document score greater than the minimum document score, determining an actual document score for the document with respect to all of the terms of the query.

15. A computer implemented method of preprocessing a database of documents for subsequent query processing, each document having a plurality of terms, each term contained in a number of documents, comprising:

selecting a plurality of terms T in the database for which the number of documents containing term T exceeds a threshold k, such that there are at least k documents containing term T;

for each term T:

determining for each document containing term T a contribution of term T to a document score of the document;

ranking the documents containing term T by the contribution of term T to the document score;

selecting a plurality of highest ranked documents; and, for each of selected documents, storing in association with the term, indicia of the document and the contribution of the term T to the document.

16. The computer implemented method of claim 15, further comprising:

creating an inverted index comprising for each unique term in the database a plurality of first entries, each first entry identifying a document containing the term and a frequency of the term in the document, the first entries ordered sequentially by document, the first entries arranged into a plurality of blocks, each block having an initial entry;

for each term T:

associating term T with a lookup table of second entries, each second entry referencing an initial entry one of the blocks in the plurality of blocks associated with term T in the inverted index.

17. The computer implemented method of claim 15, further comprising:
   for each term T:
      storing the indicia of the document and the contribution of the term T to the document, ordered according to the indicia of the document;
      storing a set of indices, each index identifying a respective one of the documents, the set ordered by indicia of the respective documents.

18. The computer implemented method of claim 15, wherein the selected plurality of highest ranked documents is selected as the n highest ranked documents, where $n \leq k$.

19. The computer implemented method of claim 15, wherein the selected plurality of highest ranked documents is selected as a function of a predetermined contribution threshold of a term to a document.

20. A computer memory readable by a processor in a database management system including a database of documents, for controlling the system to preprocess the documents, the memory including computer executable instructions for causing the system to perform the steps of:
   selecting unique terms in the database for which a plurality of documents containing the term exceeds a threshold k, such that there are at least k documents containing the unique term;
   for each selected term:
      determining for each document containing the term a contribution of the term to a document score of the document;
      ranking the documents containing the term by the contribution of the term to the document score;
      selecting a plurality of highest ranked documents; and,
      for each selected document, storing in association with the term indicia of the document and the contribution of the term to the document.

21. The computer readable memory of claim 20, further including computer executable instructions for causing the system to perform the steps of:
   for each unique term:
      storing the indicia of the document and the contribution of the term to the document, ordered according to the indicia of the document;
      storing a set of indices, each index identifying a respective one of the documents, the set ordered by indicia of the respective documents.

22. The computer readable memory of claim 20, wherein the selected plurality of highest ranked documents is selected as the n highest ranked documents, where $n \leq k$.

23. The computer readable memory of claim 20, wherein the selected plurality of highest ranked documents is selected as a function of a predetermined inverse document frequency threshold.

24. A computer memory readable by a processor in a database management system including a database of documents, for controlling the system to process a query for selected documents, the query including a plurality of terms, the memory including computer executable instructions for causing the system to perform the steps of:
   prior to the receipt of the query, determining for each of a plurality of terms a contribution of the term to a document score of each of a plurality of documents, the contribution of a term based on a frequency of the term in the document and a frequency of the term in the database;
   receiving the query; and,
   for each term of the query, scoring a plurality of documents from the determined contribution of at least one term, and from frequency information for any remaining terms of the query.

25. The computer readable memory of claim 24, further including computer executable instructions for causing the system to determine for each of a plurality of terms a contribution of the term to a document score of each of a plurality of documents by performing the steps of:
   selecting a plurality of unique terms, each of which appearing in more than k documents in the database;
   for each of the plurality of unique terms:
      determining the contribution of the term to a document score for documents containing the unique term;
      ordering the documents by the contribution of the term to the document score of the documents; and,
      storing each of a plurality of documents and contributions in association with the term.

26. The computer readable memory of claim 25, further including computer executable instructions for causing the system to score a plurality of documents, by performing the steps of:
   for each term of the query, searching in the documents stored in association with the term, and determining for each of a first subset of the documents a document score based on the contribution of the term to the document, and upon frequency information for other terms of the query;
   ranking the documents by their document scores; and,
   returning a selected number of highly ranked documents.

27. The computer readable memory of claim 26, further including computer executable instructions for causing the system to perform the steps of:
   prior to the receipt of the query, and for each of the plurality of unique terms:
      storing in an inverted index a plurality of first entries, each first entry identifying a document and having a frequency of the unique term in the document; and,
      storing in association with the unique term a lookup table including a plurality of second entries, each second entry identifying a document in a first entry in the inverted index, and having a reference to a location of the first entry, for obtaining from the inverted index frequency information for the term.

28. The computer readable memory of claim 26, further including computer executable instructions for causing the system to score a plurality of documents by performing the steps of:
   for a term of the query for which the contribution of the term to documents was not determined prior to the query:
      determining the contribution of the term to a plurality of documents and storing the contribution of the term with respect to each of the documents; and,
      scoring at least one document using the newly determined contribution of the term.

29. The computer readable memory of claim 26, further including computer executable instructions for causing the system to score a plurality of documents by performing the steps of:
   responsive to at least one document for which a contribution of a query term was not determined prior to the query, suspending scoring of the document with respect to query term and remaining query terms, determining a maximum document score, and storing the document with maximum document score in a first set;
   completing the scoring of documents with respect to terms of the query and other documents in the database, to produce a second set of documents including a document having a minimum document score; and, for only those documents in the first set that have a maximum document score greater than the minimum document score, determining an actual document score for the document with respect to all of the terms of the query.

30. A database management system, comprising:

a first ordered plurality of unique terms stored in a computer readable memory, each unique term associated in the memory with:

a plurality of (document, term contribution) tuples, the term contribution computed prior to the receipt of some query containing the unique term and being a scalar measure of the contribution of the unique term to a document score computable by a processor for the document after receipt of a query containing the unique term, the tuples selected as those documents having the highest term contributions for the unique term from all documents in the database, the tuples ordered by the term contribution;

a first method executable by a processor that receives a query containing a plurality of terms and for each term of the query, serially accesses a first subset of the tuples associated with the term, and computes for each document in a tuple in the first subset of the tuples, a document score for the document based on the contribution in the tuple.

31. The database management system of claim 30, further comprising:

a preprocess method executable by a processor that selects the first plurality of unique terms from a plurality of terms in an inverted index, and creates the tuples for a term from frequency data of the term in each of a number of documents in which the term appears.

* * * * *

UNITED STATES PATENT AND TRADEMARK OFFICE
CERTIFICATE OF CORRECTION

PATENT NO. : 5,915,249

DATED : June 22, 1999

INVENTOR(S) : Graham Spencer

It is certified that error appears in the above-identified patent and that said Letters Patent is hereby corrected as shown below:

Column 4, line 24, after "such" insert --as--.

Column 5, line 33, after "would" insert --have--.

Column 6, line 6, after "more" insert --of--.

Column 6, line 26, replace "is" with --in--.

Column 7, line 64, replace "a" with --an--.

Column 8, line 17, after "be" insert --a--.

Column 14, line 65, after "in" insert --the--.

Column 16, line 9, replace "then" with --than--.

Column 16, line 30, replace "then" with --than--.

Column 16, line 35, replace "then" with --than--.

Column 16, line 49, replace "disgarded" with --discarded--.

Signed and Sealed this

First Day of February, 2000

Attest:

Q. TODD DICKINSON

Attesting Officer

Acting Commissioner of Patents and Trademarks